F. MOSER.
NUT LOCK.
APPLICATION FILED MAY 12, 1909.
936,553.
Patented Oct. 12, 1909.
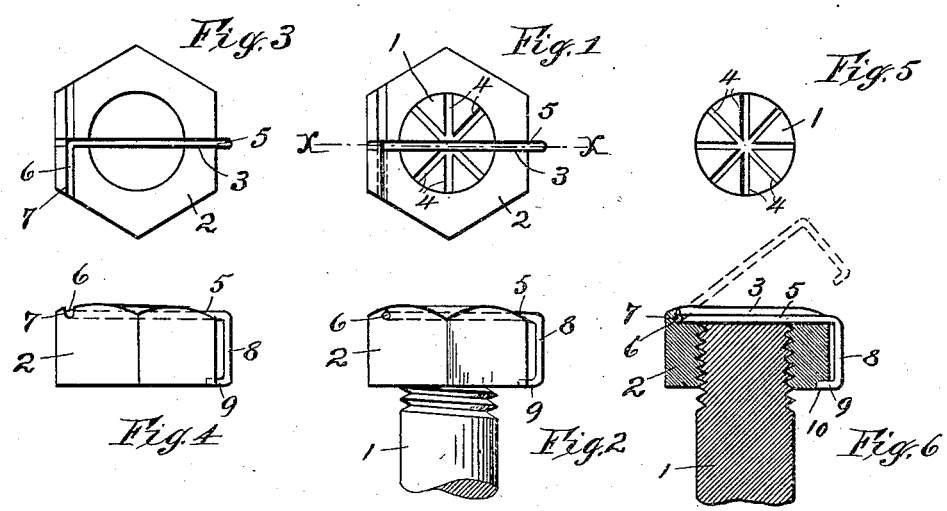
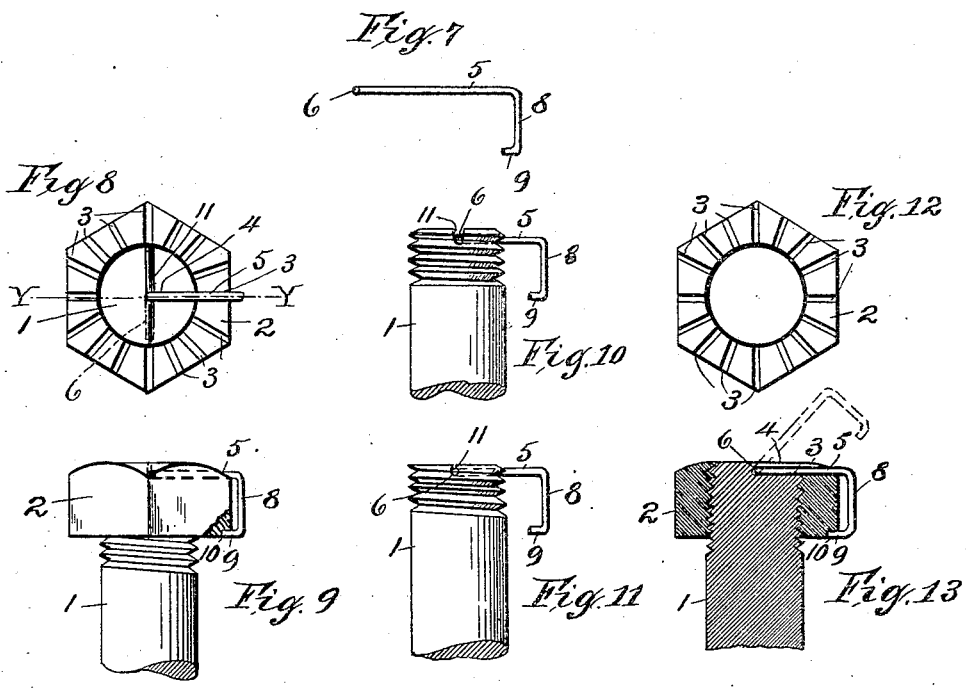
WITNESSES:
Chas. H. Hughes.
Storm V. Boyd Jr.
INVENTOR.
Fred Moser
E. Laassle
BY
his ATTORNEYS.

UNITED STATES PATENT OFFICE.

FRED MOSER, OF AUBURN, NEW YORK.

NUT-LOCK.

936,553.     Specification of Letters Patent.     Patented Oct. 12, 1909.

Application filed May 12, 1909. Serial No. 495,445.

*To all whom it may concern:*

Be it known that I, FRED MOSER, a citizen of the United States, and resident of Auburn, in the county of Cayuga, in the State of New York, have invented new and useful Improvements in Nut-Locks, of which the following, taken in connection with the accompanying drawings, is a full, clear, and exact description.

The main object of this invention is to provide simple, reliable means for locking a nut to an ordinary bolt or analogous externally screw-threaded object and which can be easily and conveniently manipulated for the purpose stated or to permit the nut to be removed when required.

A further object is to provide a locking device which can be applied to either the nut or bolt by drop hammer work and which shall be very inexpensive to produce.

To that end the invention consists in the combination with a bolt and a nut thereon, of a bar hinged to one of the parts and adapted to be swung into and out of locking engagement with the other part.

The invention resides particularly in the novel attachment of the locking-bar to either the nut or bolt and in the positive and automatic means for retaining the bar in locking position.

In the accompanying drawings Figure 1 is an end view of a bolt having a nut thereon and illustrating the preferred arrangement of the locking-bar; Fig. 2 is a side view of the same; Figs. 3 and 4 are detached outer face and side views respectively of the nut, showing the manner of applying the locking-bar thereto; Fig. 5 is a detail end view of the bolt; Fig. 6 is a longitudinal section on the line —x—x— in Fig. 1; Fig. 7 is a detail view of said locking-bar; Fig. 8 is an end view of a bolt having a nut thereon and the locking-bar pivotally connected to the said bolt; Fig. 9 is a side view of the bolt and nut with latter arrangement of the locking-bar; Figs. 10 and 11 are detail side views of a bolt illustrating the manner of applying the locking-bar thereto; Fig. 12 is a detached outer face view of the nut which is used when the locking-bar is attached to the bolt; Fig. 13 is a longitudinal section taken on the line —y—y— in Fig. 8.

In the said drawings like numerals of reference indicate like parts.

—1— denotes an ordinary bolt and —2— the nut.

Referring to Figs. 1, 2, 3, 4, 5 and 6 it will be seen that the outer face of the nut is provided with a single diametric groove —3— which is designed to register with one or more correspondingly arranged grooves —4— in the end of the bolt. To securely lock the nut to the bolt, I provide the locking-bar —5— which is composed preferably of spring-wire and is hinged to the nut so as to swing lengthwise of the bolt, whereby it is adapted to engage the two registering grooves of the nut and bolt.

To permanently apply the locking-bar —5— to the nut so as to permit the same to be swung as stated, I form this hinged connection by bending one end portion of the bar preferably at a right angle as shown at —6— and inserting said bent portion in a channel —7— which is provided in the outer face of the nut —2— and is disposed at an angle to intersect the groove —3—. When the bent portion —6— is thus inserted the nut is subjected to the action of a drop-hammer or other machine, whereby the metal at the edges of the channel is clenched around the said inserted portion of the bar, sufficient looseness being obviously provided to allow the said portion to turn in the channel.

To securely retain the bar in locking position, I provide the free end portion with a catch adapted to be sprung onto the rear face of the nut. To form this catch I bend said portion of the wire so as to extend along the side of the nut as shown at —8— and terminate said portion with an inward deflection —9— to produce a hook which engages a recess —10— in the rear face of the nut as clearly illustrated in Fig. 6. The bent portion —8— is preferably out of contact with the side of the nut to permit the insertion of a convenient instrument or tool therebetween to force the deflected portion —9— out of engagement with the recess —10— in order to permit the bar to be swung out of locking position as indicated by dotted lines in Fig. 6.

By referring to Figs. 8, 9, 10, 11, 12 and 13 it will be seen that the locking-bar may be attached to the end of the bolt. In this instance the said bolt is provided with a single radial groove —4—, and the nut is provided with one or more correspondingly disposed grooves —3— designed to register with the groove —4— when the nut is turned. To hinge the locking-bar in this instance, I provide the end of the bolt with a channel —11— disposed at an angle to and intersecting the groove —4—, in which channel is inserted the bent portion —6— of the bar. After placing the bent portion in the channel the end of the bolt is subjected to the action of a drop-hammer or other machine as before stated, whereby the metal at the edges of the channel is clenched around said bent portion as best seen in Figs. 10 and 11. By thus hinging the bent portion —6— to the end of the bolt the bar is permitted to be swung in the manner aforesaid and is thus adapted to engage two registering grooves as shown more clearly in Fig. 13.

I do not limit myself to the use of the catch hereinbefore described for retaining the bar in locking position, as other means may be employed for the purpose.

What I claim is:—

1. The combination with a bolt and nut, one of the parts being provided with a cross groove and a channel disposed in the plane of the groove and intersecting it, the other part provided with a plurality of like grooves adapted to be brought into registry with the aforesaid groove when the nut is turned, of a locking-bar bent at right angles at one end portion and hinged thereat in the aforesaid channel to permit the bar to swing into and out of engagement with the registering grooves, the free end portion of said locking-bar being formed with a catch for retaining the bar in locking position as set forth.

2. The combination with a bolt and nut, one of the parts being provided with a single cross groove, and the other part provided with one or more corresponding grooves adapted to be brought into registry with the aforesaid groove when the nut is turned, of locking-means consisting of a spring-metal bar having an L-shaped end portion pivotally connected to the single-grooved part whereby the said bar is adapted to be swung to engage the registering grooves, the opposite end portion of the bar being bent angularly and terminating in a hook adapted to be sprung onto the back of the nut for retaining the bar in its engagement with the grooves as set forth.

3. The combination with a bolt provided in its threaded end with a cross groove, and a nut provided in its outer face with a coinciding groove and provided in its rear face adjacent to the side thereof with a recess, of a locking-bar composed of spring-wire and bent angularly at one end portion, said bent portion having a hinged connection with one of the parts so as to swing across the bolt to lie in the coinciding groove, the free end portion of said bar being bent at right angles so as to extend approximately the depth of the nut and terminating in a deflection disposed parallel with the bar and adapted to be sprung into the aforesaid recess for the purpose set forth.

4. The combination with a bolt and nut, one of the parts being provided with a cross groove and a channel disposed in the plane of the groove and intersecting it, the other part provided with one or more grooves adapted to be brought into registry with the aforesaid groove when the nut is turned, of a locking-member consisting of a piece of spring-wire and having an angularly bent portion lying in the aforesaid channel, the metal at the edges of said channel being clenched around said bent portion to form a hinged connection for the bar, whereby the latter is adapted to swing into and out of engagement with the registering grooves, the free end portion of the locking-bar being bent to extend along the side of the nut and terminating with an inward deflection engaging the rear face of the nut for the purpose set forth.

5. The combination with a bolt and nut, the said nut being provided in its outer face with a cross groove and a channel disposed at an angle to and intersecting the groove, and provided in its rear face adjacent to the edge thereof with a recess, a locking-bar composed of a piece of spring-wire having one end portion bent angularly to lie in the aforesaid channel, the metal at the edges of the channel being clenched around the bent portion to allow the same to turn in the channel whereby the bar is adapted to swing across the nut, the end of the bolt provided with one or more grooves disposed to be brought into registry with the groove of the nut when the latter is turned to permit the bar to engage the registering grooves, the free end of the locking-bar being bent to form a catch adapted to be sprung into the aforesaid recess to retain the bar in locking position as set forth.

FRED MOSER.

Witnesses:
E. CLARENCE AIKEN,
RAY S. MESSENGER.